United States Patent [19]

Lasoen

[11] 4,409,858
[45] Oct. 18, 1983

[54] TRANSMISSIONS

[75] Inventor: Jean J. Lasoen, Ville Preux, France

[73] Assignee: Massey-Ferguson Services N.V., Curacao, Netherlands Antilles

[21] Appl. No.: 253,746

[22] PCT Filed: Jul. 15, 1980

[86] PCT No.: PCT/EP80/00055

§ 371 Date: Mar. 23, 1981

§ 102(e) Date: Mar. 17, 1981

[87] PCT Pub. No.: WO81/00292

PCT Pub. Date: Feb. 5, 1981

[30] Foreign Application Priority Data

Jul. 23, 1979 [GB] United Kingdom ............... 7925589

[51] Int. Cl.³ ........................... F16H 5/06; F16H 3/08
[52] U.S. Cl. .................................. 74/337.5; 74/359; 74/360; 74/357
[58] Field of Search ............. 74/337.5, 339, 363, 74/360, 359, 357, 334, 333

[56] References Cited

U.S. PATENT DOCUMENTS

| Re. 26,989 | 11/1970 | Lewis ................... 74/337.5 |
| 901,456 | 10/1908 | Loitron .................. 74/363 |
| 1,686,240 | 10/1928 | Klausmeyer ............ 74/333 |
| 1,686,383 | 10/1928 | Klausmeyer ............ 74/333 |
| 2,220,542 | 11/1940 | Peterson . |
| 2,416,154 | 2/1947 | Chilton .................. 74/339 |
| 2,529,067 | 11/1950 | Bennett et al. ......... 74/339 |
| 2,577,019 | 12/1951 | Kesterton .............. 74/334 |
| 2,710,546 | 6/1955 | Du Shane et al. . |
| 2,772,652 | 12/1956 | Du Shane et al. . |
| 2,787,167 | 4/1957 | Schwab . |
| 2,821,866 | 2/1958 | Eserkahn .............. 74/339 |
| 2,919,593 | 1/1960 | Spohn ................... 74/337.5 |
| 3,214,987 | 11/1965 | Schenck et al. . |
| 3,468,177 | 9/1969 | Kiss ....................... 74/339 |
| 3,500,697 | 3/1970 | Schowalter ............ 74/337.5 |
| 3,893,347 | 7/1975 | Fracchioni et al. ..... 74/337.5 |

FOREIGN PATENT DOCUMENTS

| 963390 | 3/1957 | Fed. Rep. of Germany ..... 74/337.5 |
| 901545 | 7/1945 | France ................... 74/359 |
| 1029138 | 5/1953 | France ................... 74/337.5 |
| 1180071 | 6/1959 | France . |
| 1292178 | 3/1962 | France ................... 74/337.5 |
| 1434389 | 2/1966 | France . |
| 2105031 | 9/1970 | France . |
| 2109790 | 5/1972 | France . |
| 224142 | 11/1924 | United Kingdom ....... 74/333 |
| 1119970 | 7/1968 | United Kingdom . |

Primary Examiner—Kenneth Dorner
Assistant Examiner—D. Wright
Attorney, Agent, or Firm—John C. Thompson

[57] ABSTRACT

A vehicle transmission with parallel input (30) output (19), and idler (35) shafts each provided with first (28,31,34) and second (29,32,33) gear wheels. The first gear wheels (28,31) on the input and output shafts are in constant mesh and the first gear wheel (34) on the idler shaft meshes with the input shaft first gear wheel (28) alone, while the second gear wheels (29,32) on the input and output shaft are in constant mesh and the second gear wheel (33) on the idler shaft meshes with the output shaft second gear wheel (32) alone. A synchromesh clutch unit (36) selectively connects the input shaft first and second gear wheels with the input shaft and a non-synchromesh clutch unit (37) selectively connects the output shaft first and second gear wheels with the output shaft to obtain a number of different output shaft ratios. The control means (65,63,64,61,62,59,57,60:65,63,64,70,71,68,67,69) for the transmission is arranged to ensure that the non-synchromesh clutch unit is engaged before the synchromesh clutch unit on the selection of each output shaft ratio.

14 Claims, 22 Drawing Figures

| FORWARD RANGE | FORWARD RATIO No. | INPUT TRAIN Z GEARS USED BY REFERENCE No. | | MAIN TRAIN X GEARS USED BY REFERENCE No. | | | | OUTPUT TRAIN Y GEARS USED BY REFERENCE No. | |
|---|---|---|---|---|---|---|---|---|---|
| | | 29,32 | 28,31 | 10,15 | 11,16 | 12,17 | 13,18 | 23,25 | 13,18,23 |
| A | 1 | X | | X | | | | X | |
| A | 2 | X | | | X | | | X | |
| A | 3 | X | | | | X | | X | |
| A | 4 | X | | | | | X | X | |
| B | 5 | | X | X | | | | X | |
| B | 6 | | X | | X | | | X | |
| B | 7 | | X | | | X | | X | |
| B | 8 | | X | | | | X | X | |
| C | 9 | X | | X | | | | | X |
| C | 10 | X | | | X | | | | X |
| C | 11 | X | | | | X | | | X |
| C | 12 | X | | | | | X | | X |
| D | 13 | | X | X | | | | | X |
| D | 14 | | X | | X | | | | X |
| D | 15 | | X | | | X | | | X |
| D | 16 | | X | | | | X | | X |

FIG. 17

| REVERSE RANGE | REVERSE RATIO No. | INPUT TRAIN Z GEARS USED BY REFERENCE No. | | MAIN TRAIN X GEARS USED BY REFERENCE No. | | | | OUTPUT TRAIN Y GEARS USED BY REFERENCE No. | |
|---|---|---|---|---|---|---|---|---|---|
| | | 28 34 33 32 | 29,32,33, 34,28,31 | 10,15 | 11,16 | 12,17 | 13,18 | 23, 25 | 13,18, 23 |
| $R_1$ | 1 | X | | X | | | | X | |
| | 2 | X | | | X | | | X | |
| | 3 | X | | | | X | | X | |
| | 4 | X | | | | | X | X | |
| $R_2$ | 5 | | X | X | | | | X | |
| | 6 | | X | | X | | | X | |
| | 7 | | X | | | X | | X | |
| | 8 | | X | | | | X | X | |
| $R_3$ | 9 | X | | X | | | | | X |
| | 10 | X | | | X | | | | X |
| | 11 | X | | | | X | | | X |
| | 12 | X | | | | | X | | X |
| $R_4$ | 13 | | X | X | | | | | X |
| | 14 | | X | | X | | | | X |
| | 15 | | X | | | X | | | X |
| | 16 | | X | | | | X | | X |

FIG. 18

TRANSMISSIONS

TECHNICAL FIELD

This invention relates to transmission and particularly to vehicle transmissions.

There is an increasing market requirement, particularly in such vehicles as tractors and forklift trucks, to provide a transmission with a manual forward/reverse shuttle facility and more than one reverse drive ratio. Many previous attempts to provide such a transmissin have involved the use of a large number of gear wheels and/or complex and expensive planetary gear sets and have frequently therefore been expensive, bulky and heavy.

DISCLOSURE OF THE INVENTION

It is an object of the present invention to provide a transmission which can meet the above market requirement in a particularly simple and compact manner.

According to a first aspect of the present invention there is provided a vehicle transmission assembly having parallel input, output and idler shafts each provided with a first gear wheel and a second gear wheel, the first gear wheels on the input and output shafts being in constant mesh and the first gear wheel on the idler shaft being in constant mesh with the input shaft first gear wheel along, the second gear wheels on the input and output shafts also being in constant mesh and the second gear wheel on the ilder shaft being in constant mesh with output shaft second gear wheel along, first clutch means for alternatively coupling the input shaft first or second gear wheel to the input shaft, second clutch means for alternatively coupling the output shaft first or second gear wheel to the output shaft, and control means for engaging the first and second clutch means in order to obtain a number of different output shaft ratios, said assembly being characterised in that one of the first and second clutch means in a synchromesh clutch unit of the type specified and the other of said first and second clutch means is a non-synchromesh clutch unit, in that the first and second gear wheels of the idler shaft are fixedly rotatable therewith, and in that the control means is operable to ensure that the non-synchromesh clutch unit is engaged before the synchromesh clutch unit on the selection of each output shaft ratio.

Using a transmission assembly in accordance with the present invention it is possible to provide two output shaft ratios in one rotation sense by coupling both first gear wheels or both second gear wheels to the input and output shaft.

With the inlet shaft first gear wheel and output shaft second gear wheel coupled with their respective shafts, a first output shaft rtio in the other rotational sense is obtained via a series arrangement of the input shaft first gear, the idler shaft first and second gear wheels and the output shaft second gear wheel.

With the input shaft second gear wheel and output shaft first gear wheel coupled with their respective shafts, a second output shaft ratio in the other rotational sense is obtained via a series arrangement of the input and output shaft second gear wheels and idler shaft second and first gear wheels, and the input and output shaft first gear wheels.

It is to be understood that the idler shaft and its first and second gear wheels may be provided as parts of a gear cluster or, if the first and second idler gear wheels are arranged to have the same number of teeth, all three components may be constituted by parts of a single extra wide gear wheel.

It will be appreciated from the above that the transmission assembly of the present invention provides two forward ratios and two reverse ratios from six gears and is extremely compact and economical to produce. In particular, as discussed below, the use of one synchromesh clutch unit and one non-synchromesh clutch unit not only results in a cheaper construction but also enables the spacing between the input and output shafts to be made significantly less than that necessary if two synchromesh clutch units were employed. It has been found possible to adopt this arrangement by arranging the non-synchromesh clutch to operate first.

In a preferred arrangement the first clutch means is the synchromesh clutch unit. This provides an assembly in which a synchronised manual forward/reverse shuttle is available in which the transmission assembly can be changed between a particular forward speed range and a corresponding reverse speed range simply by operating the first clutch means to change the gear wheel coupled to the input shaft.

References throughout this specification to synchromesh units or clutch units of the type specified refer to units which include a coupling member (for example a sleeve) axially slidable relative to a shaft for coupling a gear to said shaft, the coupling member being slidable from a non-engaged position in which said gear is not coupled to the shaft, through a synchronising position in which clutch members in the synchromesh unit are in frictional contact to synchronise the rotational speeds of said gear and shaft to a fully engaged position in which said gear is coupled to said shaft and axial movement of the coupling member is completed.

The control means may include a ratio selector means connected with a coupling member of each clutch unit, each coupling member being movable in both directions from a central disengaged position to selectively couple either the first or second gear wheel to the associated shaft.

The control means may further include a disconnecting means for disconnecting one of the coupling members from the ratio selector means during part of the selection of those output shaft ratios which require the coupling members to move in opposite axial directions, the arrangement being such that during the selection of those output shaft ratios both coupling members are initially moved in the same axial direction to complete the first part of the selection of said at least one ratio, the disconnecting means is then operated, and one of the coupling members is then moved in the opposite axial direction to complete the ratio selection.

The ratio selector means may be connected with a first movable cam formation having a cooperating follower for movement of the coupling member of the first clutch means and with a second movable cam formation having a cooperating follower for movement of the coupling member of the second clutch means, the two cam formations being shaped to ensure that during movement of both cam formations by the ratio selector means to select any given output shaft ratio the follower connected with the non-synchromesh clutch unit engages the non-synchromesh clutch unit first.

In an alternative arrangement the non-synchromesh clutch unit is arranged to be engaged first by ensuring that the clearances to be taken up in the control means before the non-synchromesh clutch unit is engaged are less than the clearance to be taken up in the control means before the synchromesh clutch unit is engaged.

The transmission assembly of the present invention is particularly useful for use in combination with other transmission units to provide a transmission with a large number of ratios in both rotational senses.

Thus in accordance with a second aspect of the invention there is provided a vehicle transmission comprising a transmission assembly in accordance with the first aspect of the invention in series with a main multi-ratio change speed transmission unit having parallel input and lay shafts and co-axial input and output shafts, the output shaft of the transmission assembly forming an extension of, or driving in a co-axial manner, the input shaft of the change speed transmission unit and the lay shaft of the change speed transmission unit being co-axial with the input shaft of the transmission assembly.

A two speed output gear set may be provided between the lay shaft and output shaft of the change speed transmission unit to double the ratios available from the transmission.

In the above vehicle transmission the transmission assembly and output gear set together provide a lower creeper speed range, two intermediate workings speed ranges, and a higher road speed range for the transmission, the arrangement being such that the road speed range can be engaged from either working speed range by changing the gear wheel coupled by one of the clutch means of the transmission assembly or by changing the operating ratio of the two speed output gear set.

DESCRIPTION OF DRAWINGS

The invention will now be described, by way of example only, with reference to the accompanying drawings in which:

FIGS. 17 and 18 show in tabular form the gear wheels used to obtain each transmission ratio;

BEST MODE OF CARRYING OUT INVENTION

Figure 1:
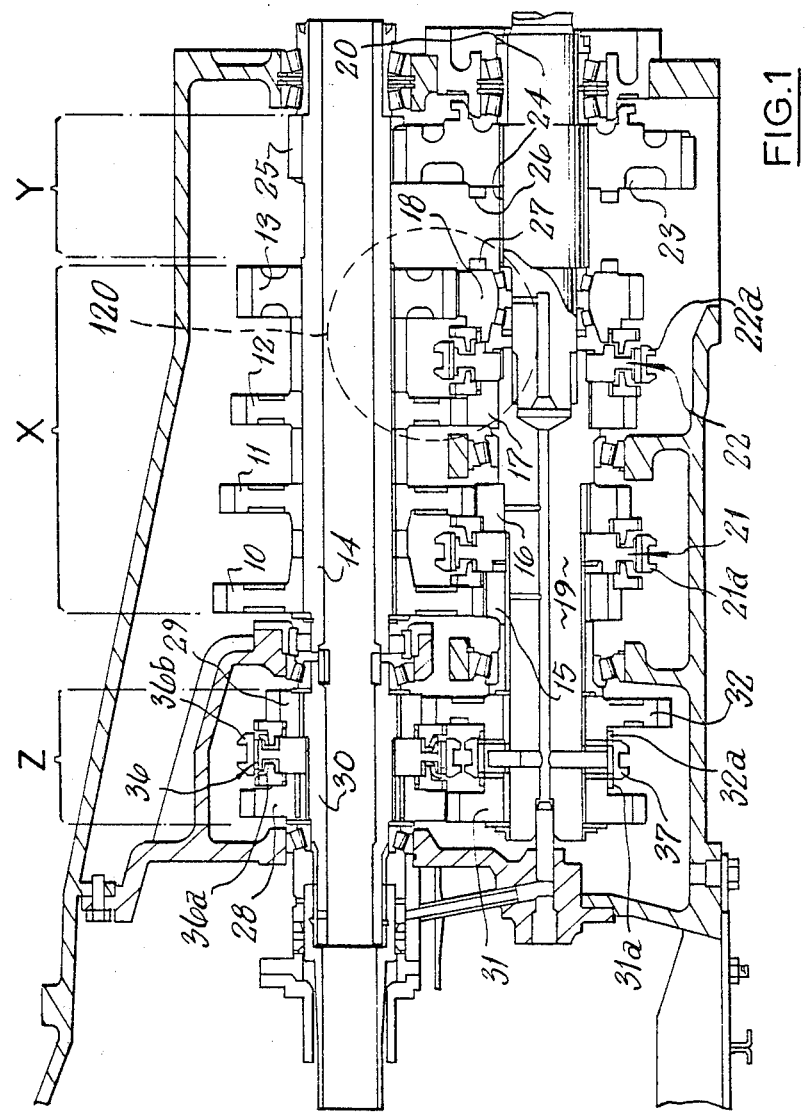
FIG. 1 is a vertical section through an agricultural tractor transmission embodying the invention.

The basic transmission construction is shown in FIG. 1. It comprises a main four speed change speed gear set X, a two speed auxiliary output gear set Y, and a constant mesh input gear set Z capable of providing two forward speeds and two reverse speeds.

The main change speed set X comprises four gears 10, 11, 12 and 13 which are splined onto a lay shaft 14 and four constant mesh gears 15, 16, 17 and 18 which are rotatably mounted on the two portions 19 and 20 of the transmission output shaft.

The gears 15 and 16 are associated with clutch means in the form of a first synchronising unit 21 while the gears 17 and 18 are associated with further clutch means in the form of a second synchronising unit 22.

As will be appreciated, a first ratio is provided in the main change speed set X by sliding the sleeve 21a of the synchronising unit 21 to the left so that power is transmitted from the shaft 19 through gears 15 and 10 onto the lay shaft 14 and back to portion 20 of the output shaft via the auxiliary output train Y. In a similar fashion a second ratio is obtained by sliding the sleeve 21a to the right thus transmitting power from the shaft portion 19 via gears 16 and 11 to the lay shaft 14 and hence to the output shaft portion 20 via the output set Y.

Similarly, two further ratios can be obtained by sliding the second sleeve 22a of the synchronising unit 22 to the left and right respectively.

The output gear set Y comprises a gear 23 slidable on splines 24 provided on the output shaft portion 20. This gear 23 is engageable with a gear 25 which rotates with the lay shaft 14 to provide a low auxiliary output train ratio. By sliding the gear 23 on the splines 24 teeth 26 on the gear 23 can be meshed with co-operating teeth 27 on the gear 18 thus locking the gear 18 to the shaft portion 20 and providing a higher output train ratio via gears 13 and 18.

Figure 2:
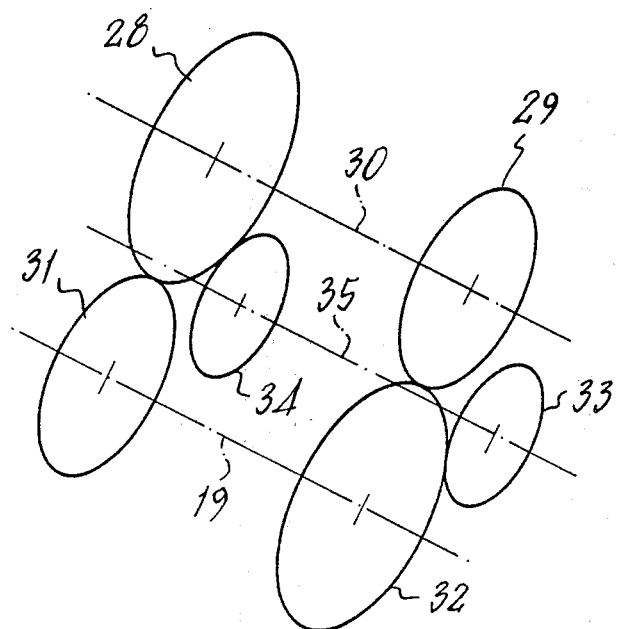
FIG. 2 is a diagrammatic representation of part of an input gear set Z of the transmission part of which is not visible in FIG. 1.

The input gear set Z comprises gears 28 and 29 which are rotatably mounted on an input shaft 30. These two gears are in constant mesh with gears 31 and 32 which are in turn rotatably mounted on the output shaft portion 19. Mounted behind the gears 28, 29, 21 and 32 as viewed in FIG. 1, are two idler gears 33 and 34 shown diagrammatically in FIG. 2 which mesh with gears 32 and 28 respectively. The idler gears rotate with a common shaft 35.

Associated with the gears 28 and 29 is a further clutch means in the form of a third synchronising unit 36 whose sleeve 36b can be used to couple either the gear 28 or the gear 29 to the input shaft 30. The clutch means for coupling either the gear 31 or 32 to the output shaft 19 comprises a simple sliding collar 37 which is coupled with shaft 19 and engageable with teeth 31a and 32a provided on gears 31 and 32 respectively.

The input gear set Z can be arranged to provide a high forward ratio by moving the sleeve 36b to the left to couple the gear 28 to the input shaft 30 and also sliding the collar 37 to the left to contact the gear 31 with the shaft portion 19. A low forward ratio can be provided by engaging the sleeve 36b with the gear 29 and sliding the collar 37 to the right to couple the gear 32 with the shaft portion 19.

A first reverse ratio is obtained from the input set Z when the sleeve 36b couples the gear 28 to the input shaft 30 and the collar 37 couples the gear 32 to the shaft portion 19. With the synchronizing sleeve and the collar in these positions drive passes from the input shaft 30 via gear 28, gear 34, shaft 35, gear 33 and gear 32 to the shaft portion 19. A further reverse ratio is obtained by engaging the synchronising sleeve 36b with the gear 29 and moving the collar 37 to couple the gear 31 with the shaft portion 19. In this condition drive is transmitted from the input shaft 30 via gear 29, gear 32, gear 33, shaft 35, gear 34, gear 28 and gear 31 to the shaft portion 19.

Thus the input set Z, is capable of providing two forward speeds and two reverse speeds which enable the whole transmission to provide, if required, sixteen forward speeds and sixteen reverse speeds.

Since, as described below, the collar 37 is always arranged to couple either the gear 31 or 32 to the output shaft portion 19 before the synchronising sleeve 36b couples either the gear 28 or 29 to the input shaft 30, the collar 37, when coupling the gear 31 or 32 to the shaft portion 19, only has to overcome the relatively low rotational inertia of the gears of input train Z since the higher inertial items such as the shaft 30 and the associated clutch parts (not shown) are not at that time coupled by the synchronising device 36. This makes it possible to use a simple sliding collar 37 rather than another synchronising unit thus making input set Z significantly cheaper and also more compact than if another synchronising unit was used in place of collar 37. In this latter regard it will be noted that the maximum radial dimension of collar 37 is significantly less than that of sleeve 36b thus allowing shafts 30 and 19 to be appreciably closer together than if collar 37 were to be replaced by another synchronising unit. This allows the whole transmission to be of a more compact design.

Figure 3:
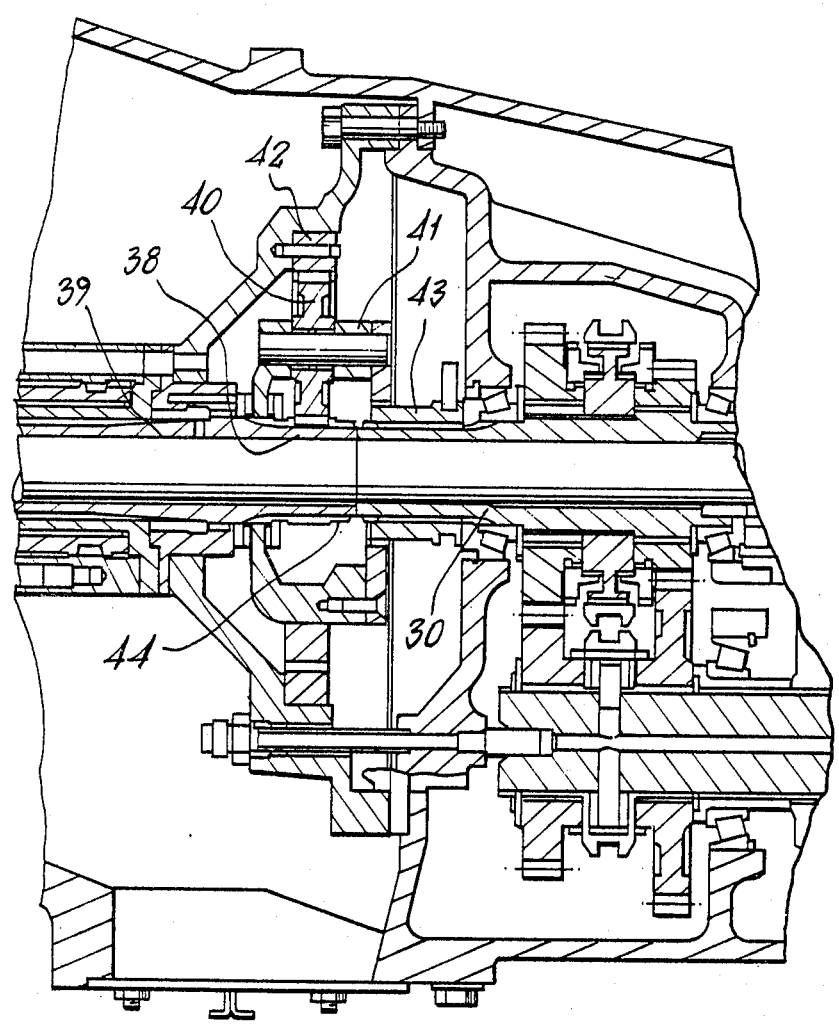
FIG. 3 shows the provision of an additional planetary gear to double the number of ratios provided by the transmission.

If desired, the speed range can be further increased by the addition of a two speed planetary gear on the input end of the transmission as shown in FIG. 3. The planetary gear includes a sun wheel 38 formed integrally on an input shaft extension 39, planet gears 40 mounted on a planet carrier 41, and an annular gear 42 which is held fixed.

A slidable sleeve 43 can occupy the position shown in FIG. 3 in which it couples the planet carrier 41 with the previously described input shaft 30 to provide a first planetary ratio or can be slid axially to engage teeth 44 formed on the input shaft extension 39 to directly couple the input shaft extension to the shaft 30 thus locking out the planetary gear to provide a second ratio.

It will be appreciated that mechanical coupling of the two speed planetary gear using the sleeve 43 can be replaced by a hydraulically operated clutch arrangement.

The two speed planetary gear, whether mechanically or hydraulically coupled, can be used as an under-drive or overdrive as required.

As indicated above the transmission (without the use of the two speed planetary gear shown in FIG. 3) provides sixteen forward speed and sixteen reverse speeds.

Figure 15:
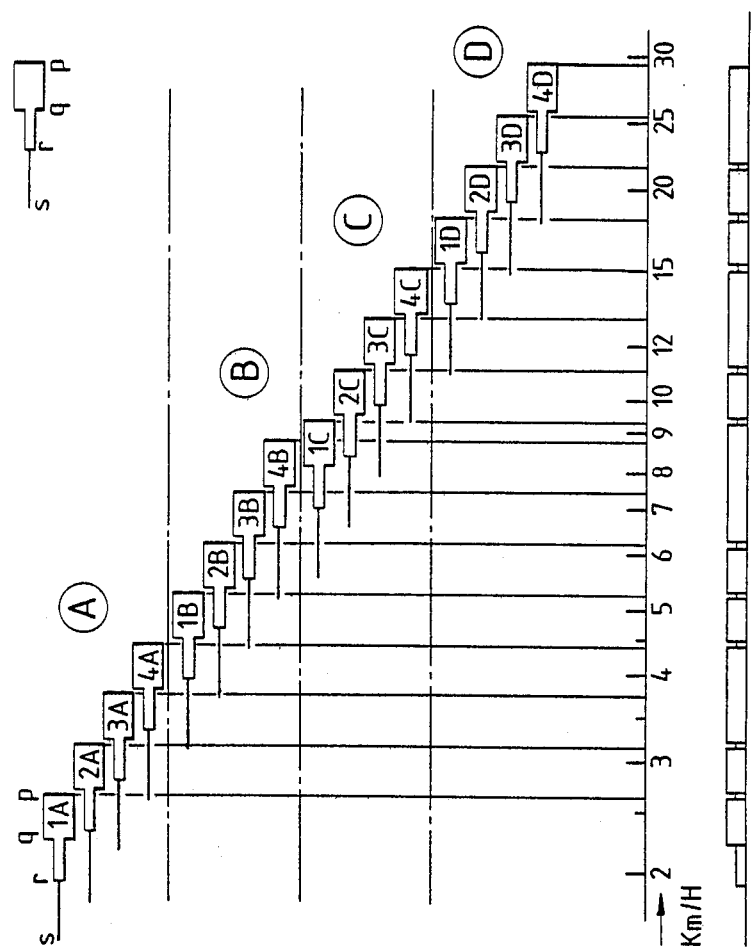
FIG. 15 shows graphically the ground speeds obtainable (in Kilometers/hour) in each ratio of a typical transmission in accordance with the invention at selected engine speeds.

These forward speeds are grouped into four ranges A, B, C and D as shown in FIG. 15. Range A is a creeper range, ranges B and C are the field working ranges and range D is the road speed range. FIG. 15 indicates the ground speeds obtainable (in Kilometer/hour) in each ratio of a typical transmission embodying the invention at selected engine speeds and clearly illustrates the flexible nature of the transmission and the good spread of ground speeds. The legend at the top right hand corner of FIG. 15 indicates the selected engine speed p, q, r and s on the block marking, these speeds being 2400, 2040, 1730 and 1400 engine revolutions per minute respectively (2400 revs/min being the rated engine speed of the engine).

Figure 12:
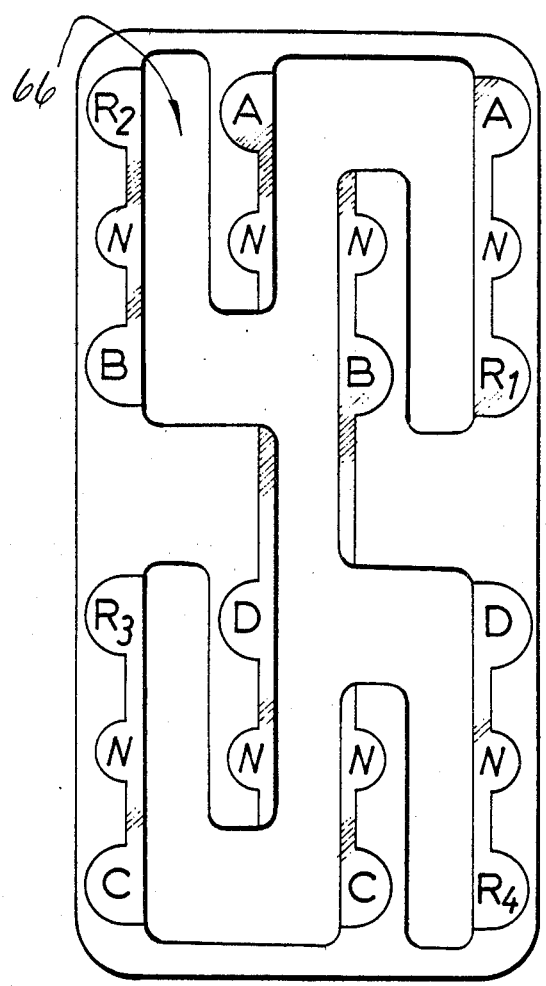
FIG. 12 shows the range selection gate of the transmission.

Selection of these ranges is under the control of a lever (not shown) which moves in a gate 66 shown in FIG. 12. Each range A, B, C and D has four sub-ratios 1 to 4 selected by a second lever (not shown) which moves in a straight gate 49 of FIG. 4.

Also, the gate 66 controls the selection of the four basic reverse ranges R1, R2, R3 and R4 which again each have four sub-ratios 1 to 4 controlled by gate 49.

Thus using the two gates 49 and 66 sixteen forward and reverse ratios can be selected.

The transmission also provides a "park" facility which is selected on gate 49 and designated "P" and which locks the transmission up to function as a parking brake.

All the ratios of the main change speed set X, the two speed auxiliary output set Y, and the constant mesh input set Z are selected by rotatable cams having cam tracks which are engaged by followers which in turn move gear selector forks to make the required gear changes.

Figure 4:
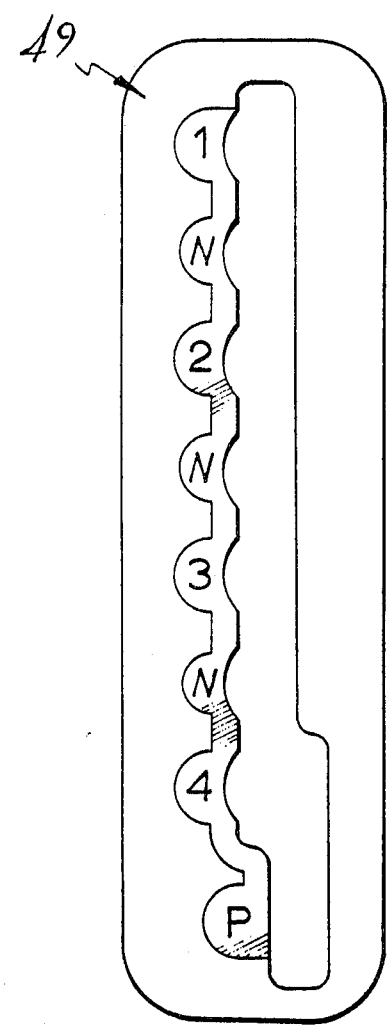
FIG. 4 shows the speed selection gate of the transmission.

The main change speed set X is controlled by the lever which moves down the straight gate 49 shown in FIG. 4. As can be seen between each ratio position a neutral condition is provided and the park facility designated "P" is available in which the set X is locked-up by simultaneously engaging the two synchronising devices 21 and 22.

Figure 5:
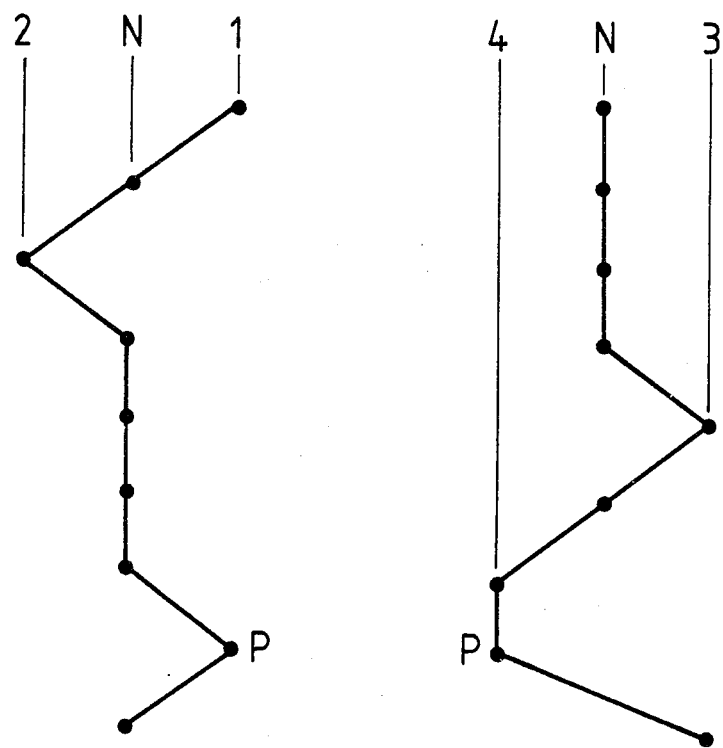
FIG. 5 shows the sequence of movement of the synchronising devices of a main change speed gear set X of the transmission.

The left and right hand portions of FIG. 5 show schematically the shifting sequence of the two synchronising units 21 and 22 respectively. FIG. 5 indicates the synchronising units are arranged so that normally when one synchronising unit is operated to engage a gear the other synchronising unit is in its neutral condition N. The facility is provided to simultaneously engage the first and fourth gear ratios provided by gears 15 and 18 in order to place the transmission in its park condition P.

Figure 6:
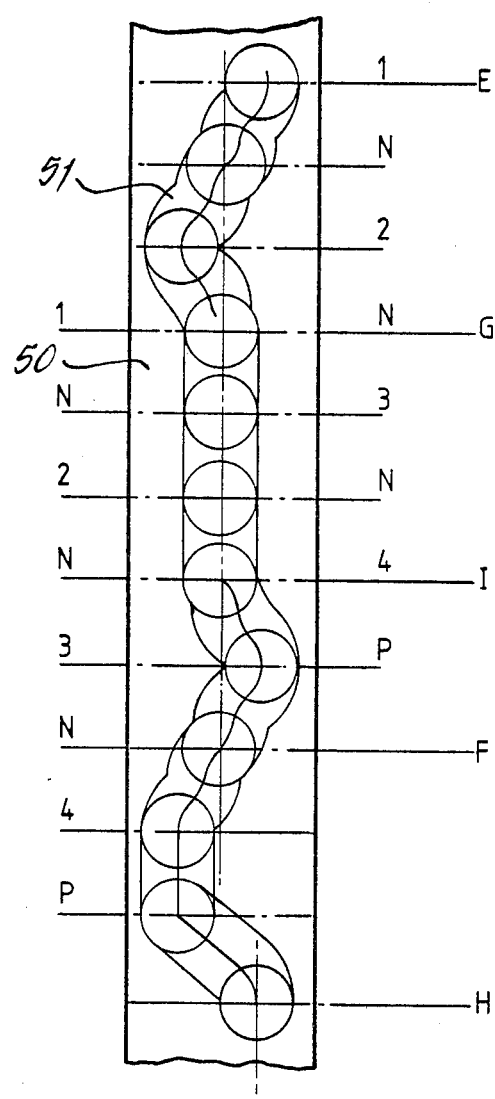
FIG. 6 shows the cam groove used to control the synchronising devices of the main change speed gear set X.

The schematic shift pattern shown in FIG. 5 is in practice translated into a single cam groove 51 formed in the periphery of a rotatable cam member 50. For ease of reference the development of this cam member is shown in FIG. 6 from which it will be readily apparent that the length EF of the groove 51 corresponds to the left hand portion of FIG. 5 and the length GH of the groove 51 corresponds to the right hand portion of FIG. 5. The two cam followers which operate in groove 51 thus share a common neutral portion GI of the groove. This arrangement in which the followers operate in the same groove 51 greatly simplifies the cam arrangement and saves a considerable amount of space inside the transmission housing by avoiding the need for two separate cams and their associated rotating means.

Figure 7:
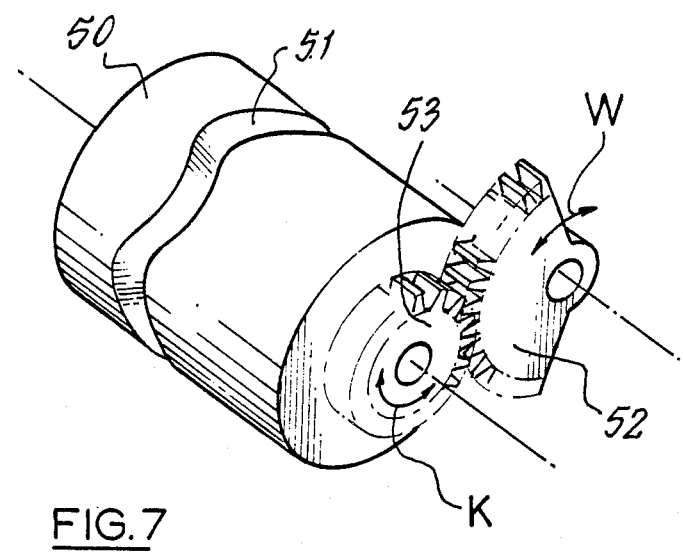
FIG. 7 shows diagrammatically the manner in which the cam having the groove of FIG. 6 is rotated.
Figure 9:
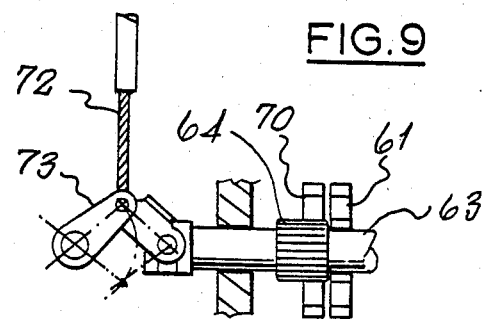
FIG. 9 is a sectional view on the line A—A of FIG. 8.

The cam 50 is shown diagrammatically in FIG. 7 and is arranged to be rotated by a toothed sector 52 which engages teeth 53 formed on the cam. Thus pivoting of the toothed sector 52 as indicated by the arrow W in FIG. 7 results in rotation of the cam 50 as indicated by the arrow K.

Figure 8:
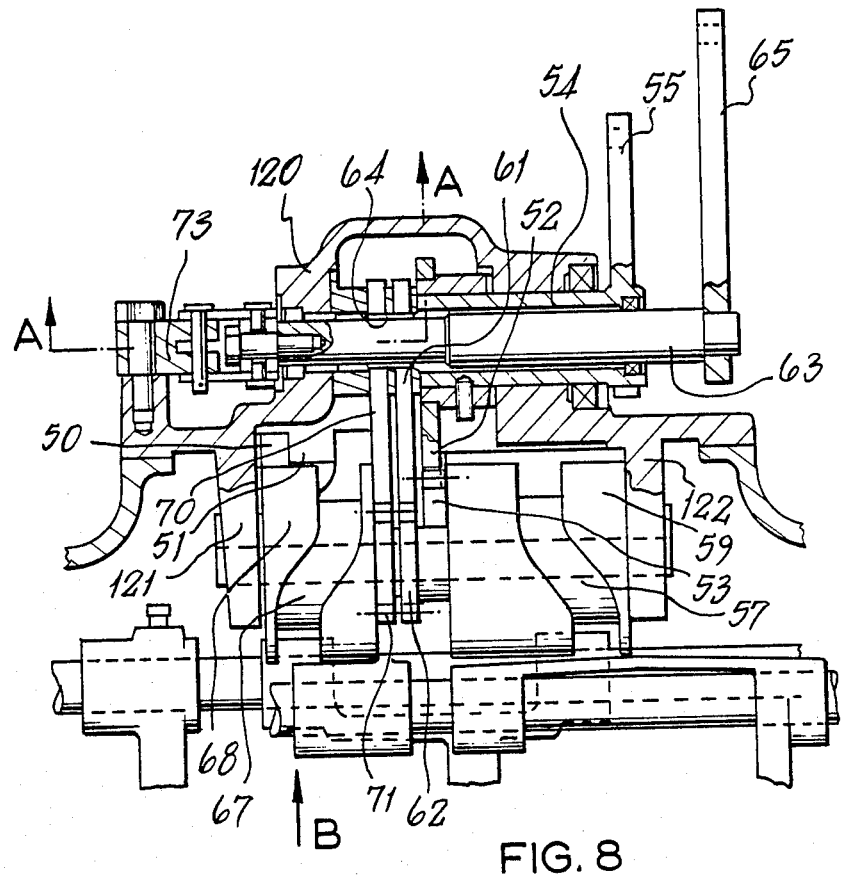
FIG. 8 shows in plan the manner in which the input set cam and auxiliary output set cam are sequenced relative to each other.

FIG. 8 shows the cam operating mechanism used in the selection of the ratios in the auxiliary output set Y and the input set Z. The cam 50 is positioned behind this cam arrangement as viewed in FIG. 8, the sector 52 being secured to a sleeve 54 which is rotated by a lever 55 coupled with the gear selection lever which moves in gate 49.

As can be seen from FIG. 8 the lever 55, sleeve 54, sector 52 and cam 50 are carried by a detachable cover 120 which is located on the right hand side of the transmission housing in the position indicated by dotted circle 120 in FIG. 1. This cover has support webs 121 and 122 which project through a circular aperture 123 in the housing and which support the cam 50 and cams 59 and 68 referred to below.

Figure 10:
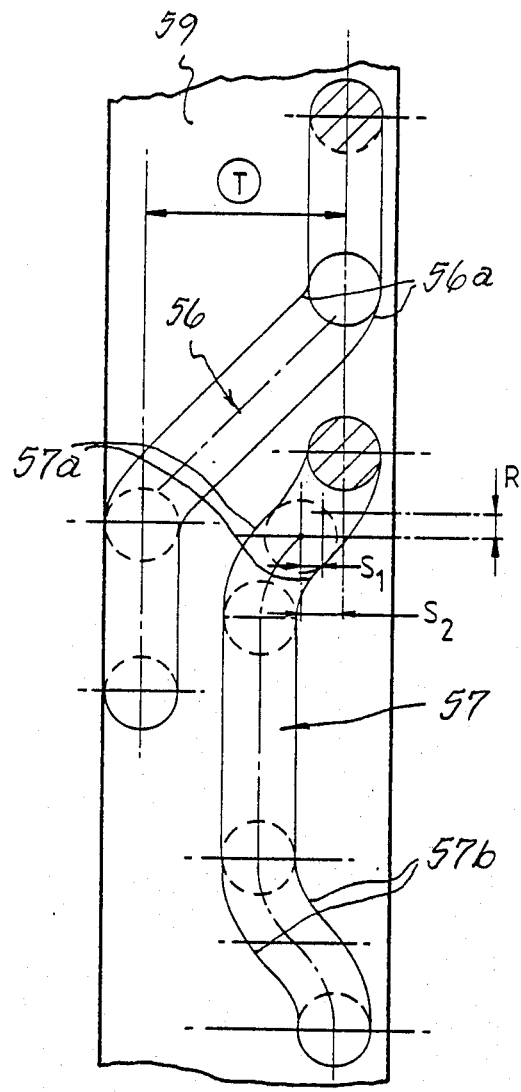
FIG. 10 shows the cam grooves which control the auxiliary output set Y and the non-synchromesh coupler of the input gear set Z.
Figures 14, 16:
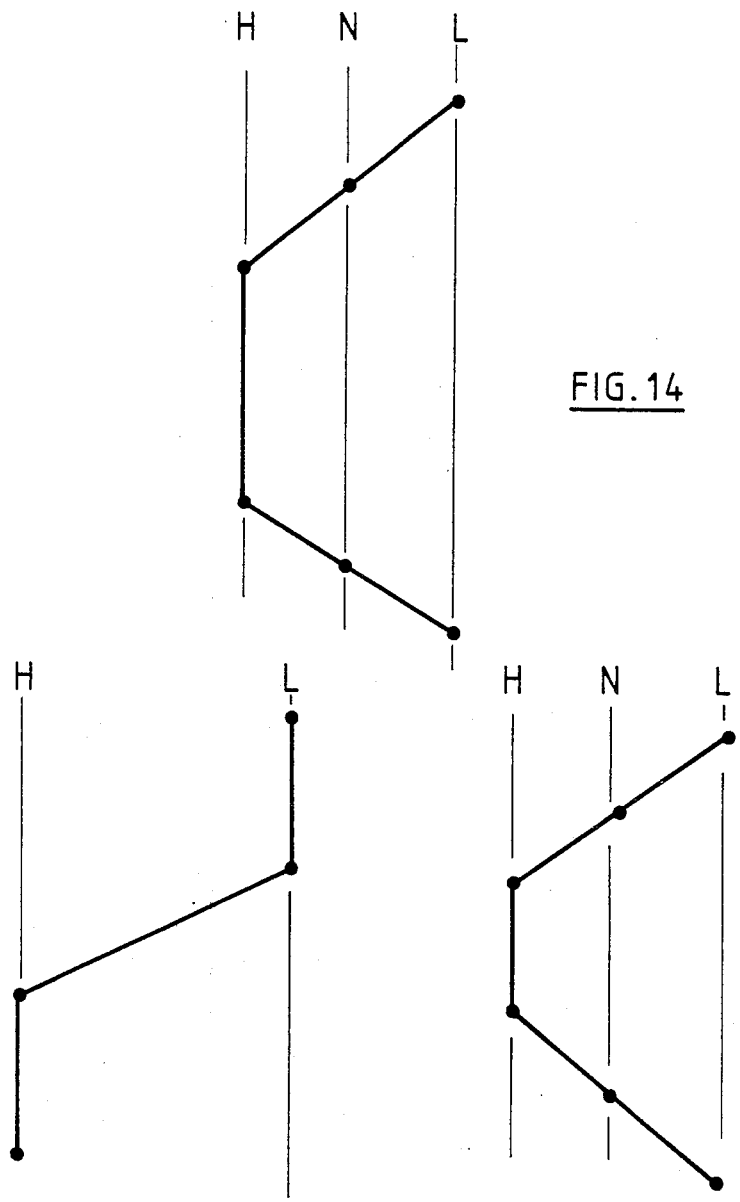
FIG. 14 shows the sequence of movements of the synchromesh coupler of the input gear set.
FIG. 16 shows the sequence of movements of the couplers of the auxiliary output gear set Y and the non-synchromesh coupler of the input gear set Z.

Turning now to the control of the auxiliary output set Y and the movement of the collar 37, this is under the control of cam tracks 56 and 57 cut in the periphery of a rotatable cam 59. These cams, whose developments are shown in FIG 10, are representations of the shift pattern for the auxiliary output set Y and the collar 37 as shown schematically in FIG. 16. Thus the cam groove 56 corresponds to the left hand portion of FIG. 16 and the groove 57 corresponds to the right hand portion of FIG. 16.

Figure 11:
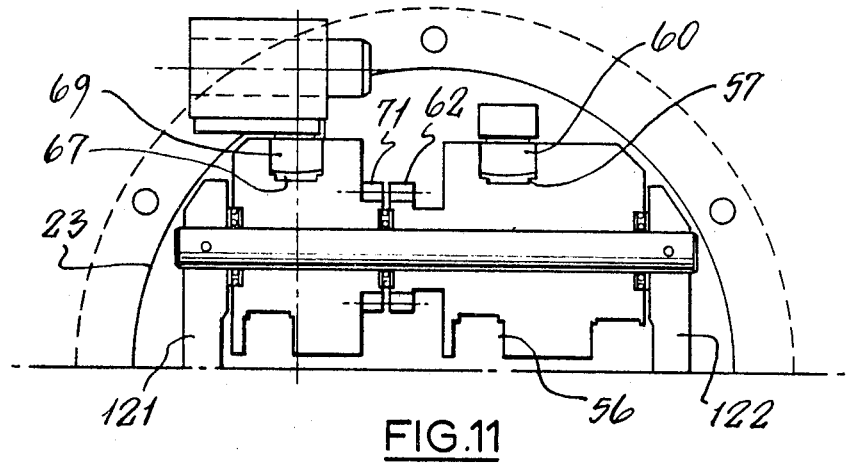
FIG. 11 shows a side view in the direction of arrow B of FIG. 8 of the upper half of the cam arrangement shows in FIG. 8.

A cam follower shown at 60 in FIG. 11 engages the groove 57 while a corresponding follower (not shown) engages the groove 56. As these followers follow along their respective grooves the necessary axial sliding movement of the associated selector forks to effect the movement of the gear 23 and the collar 37 occurs. As will be appreciated, since the throw required to change the operating ratio of the auxiliary output set Y is large this must be reflected in the sideways throw T of the cam groove 56 which is appreciably greater than that of groove 57.

As can be seen from FIGS. 10 and 11 by appropriate operation of the cam 59 four different speed ratios can be obtained using the two positions of the gear 23 and the two alternative positions of the collar 37.

The cam 57 is rotated by a geared sector 61 which engages a gear 62 formed on the cam 59 in a similar manner to the way in which the selector 52 engages the gear 53. The sector 61 is splined onto a shaft 63 at 64 and the shaft 63 is rotated via an arm 65 connected with the gear lever (not shown) which moves in the gate 66 shown in FIG. 12. Shaft 63 is again carried by cover 120. Thus movement of the lever which moves in the gate 66 rotates the shaft 63 and hence rotates the cam 59 via sector 61 and gear 62.

Control of the synchronising unit 36 is effected by a cam groove 67 cut in a cam 68. The development of this groove is shown in FIG. 13 and is again simply the shift pattern for the synchronising unit 36 as shown schematically in FIG. 14.

The cam groove 67 is engaged by the follower 69 shown in FIG. 11. Rotation of the cam 68 is effected by a geared sector 70 which is splined onto the shaft 63 at 64 and drives a gear 71 formed on the cam 68. As previously described, for forward drive ratios the synchronising sleeve 36b and collar 37 are either both moved to the left or to the right from their neutral positions. This requires synchronisation of the rotation of cams 59 and 68. This synchronisation is achieved by virtue of the fact that both gear sectors 61 and 70 are rotated from the same splined connection 64 on the shaft 63.

When the input train Z is operated to give a reverse drive ratio the synchronising sleeve 36b and collar 37 are moved one to the left and one to the right of their neutral positions in order to transmit drive to the idler gears 33 and 34.

In order that the synchronising sleeve 36b and collar 37 can occupy positions on opposite sides of their neutral position it is necessary to break the synchronisation of the rotation of cams 59 and 68. This is achieved by axially displacing the shaft 63 so that the splines 64 disengage the gear sector 61 whilst remaining engaged with the sector 70. This sliding of the shaft 63 is achieved by either pulling or pushing on the cable 72 which operates the toggle linkage 73 secured to the end of the shaft 63.

Thus, for example, when reverse range R1 is selected on the gate 66 this is achieved in two states. Firstly if the lever is not already in the range A position it is moved to this position and in so doing rotates the two cams 59 and 68 in synchronism under the control of shaft 63 to the appropriate position for range A. Next the lever is moved from the range A position to the reverse range R1 position. This movement firstly displaces the cable 72 which in turn moves the shaft 63 thus disengaging sector 61 and hence leaving the output set Y and collar 37 in the range A position and secondly rotates the cam 68 in the reverse direction to move the synchronising sleeve 36b from the range A position to the range R1 position.

The manner in which the input gear set ratios are selected by cam 59 and 68 is the subject of the Applicants U.K. Pat. No. 2,055,162.

As will be appreciated the transmission provides four manual forward/reverse shuttle changes between the A, R1:B, R3 and C, R4 positions. Each of these shuttle changes involves the movement of only the synchronising coupling sleeve 36b to the right or left as the case may be.

FIGS. 17 and 18 show in tabular form the gear wheels used in the transmission shown in the drawings to provide each of the transmission's thirty-two ratios. It has been found possible to arrange for several of the gear wheels used in the transmission to have the same number of teeth enabling either actual common gear wheels or at least common gear wheel hobbing machinery to be used to provide these gear wheels thus giving a significant economy in the manufacture of the transmission by still further reducing the number of different gear wheels provided. In one example of the transmission described, gear wheel 11 has the same number of teeth as gear wheel 32, gear wheel 13 has the same number of teeth as gear wheel 28, gear wheel 16 has the same number of teeth as gear wheel 29, and gear wheel 18 has the same number of teeth as gear wheel 31.

As stated above ranges B and C are the two field working ranges while range D is the road speed range. Thus, for example, when a tractor is being operated in a field with a particular implement it is normally operating in either range B or range C and there is normally little requirement to switch between these two ranges although the operator will require the facility to switch from which ever of these ranges is being used to the road speed D range on, for example, his journey to and from the field. For this reason the range selection gate 66 shown in FIG. 12 is laid-out with the road speed range D positioned between the two field working ranges B and C so that range D can be reached directly from either range B or range C. It will also be seen from a consideration of FIG. 17 that changing to range D from range B or range C requires only one change in the transmission coupling. For example, changing to range C from range D only involves the sliding of coupling sleeve 36b and changing to range B from range D only involves the sliding of gear 23. This compares favourably with changes between ranges B and C which involve sliding of both coupling sleeve 36b and gear 23. Thus, with the range D position between the range B and C positions, changes between each of the adjacent ranges on the gate 66 only involves one change in the transmission coupling.

The profiles of cam grooves 56 and 57 are basically straight or large radius curved tracks jointed together smoothly by the use of appropriate radii 56a, 56b and 57a, 57b (see FIG. 10). This simple profile is possible since the ratio changes controlled by these grooves are not synchronised.

However, the grooves 51 and 67 which control the synchronised changes are "wavy" in nature. Thus for example, referring to FIG. 13 the groove 67 makes the change from portion 67a to 67b by way of radiused portions 67c, 67d, 67e and 67f on the left side of the groove and complementary radiused portions 67g, 67h, 67i, and 67j on the other side of the groove.

Figure 13:
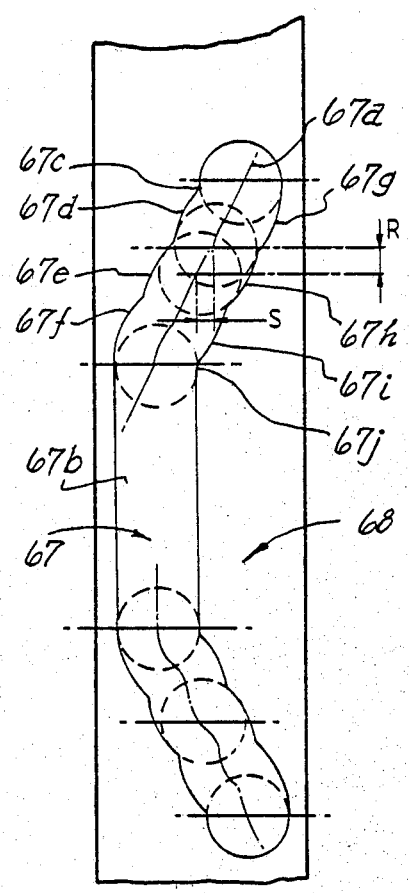
FIG. 13 shows the cam groove which controls the synchromesh coupler of the input gear set Z.

Comparison of FIGS. 10 and 13, which are laid out on the same scale, indicates that after a given cam movement R of cam 68 a sideshift S away from neutral of the follower engaged in the groove 67 has occurred whereas for the same movement R of cam 59 a larger sideshift S1 is obtained. This ensures that the sleeve 37 is engaged with teeth 31a or 32a before the synchronising unit 36 couples the gear 28 or 29 to the shaft 30.

In practice the sideshift S is arranged to take up the clearances in the synchronising unit and bring the synchronising clutch parts 36a into engagement while the sideshift S1 is sufficient to partially engage the sleeve 37 with either teeth 31a or 32a. After synchronisation has taken place the groove 67 effects further axial sliding of the synchronising coupling sleeve 36b thus coupling gear 28 or 29 to the shaft 30. During this further movement along groove 67 the sleeve 37 is moved to its full engaged position of groove 57 completing a total sideshift movement of S2 as shown in FIG. 10.

Figure 19:
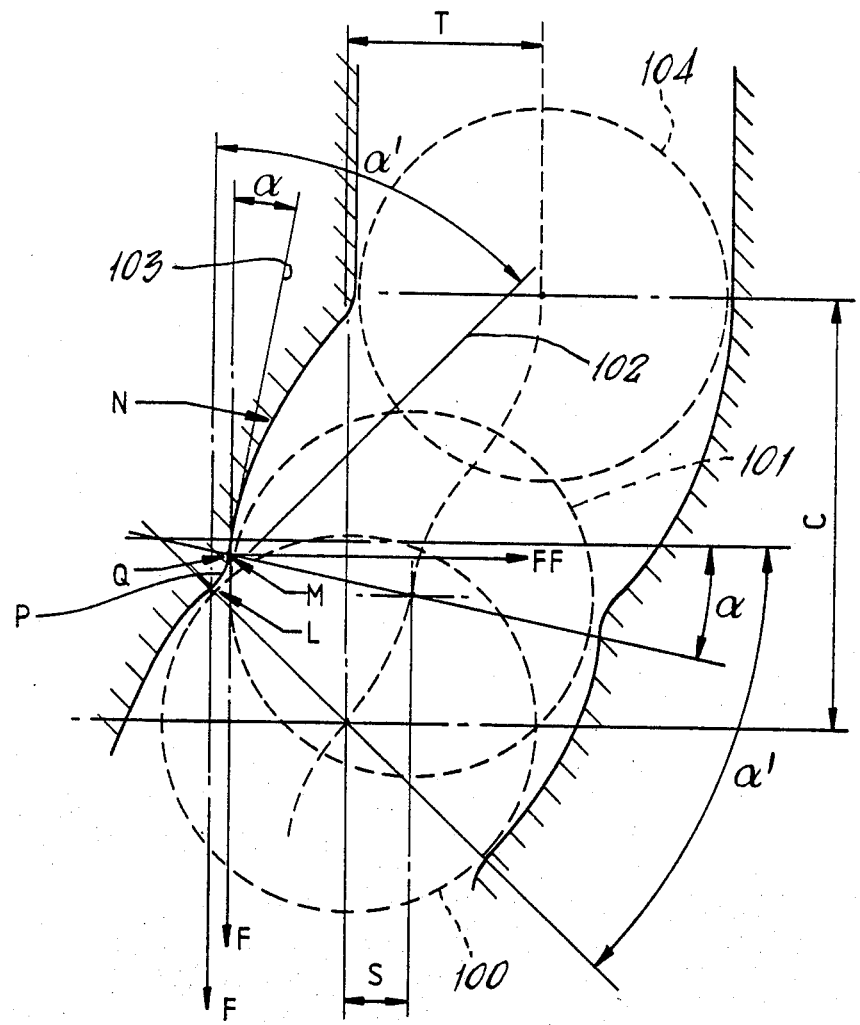
FIG. 19 shows part of the cam groove of FIG. 13 on an enlarged scale.

The shape of groove 67 and the manner in which it effects movement of the associated follower and sleeve will now be discussed in more detail. FIG. 19 shows part of the groove 67 of FIG. 13 on an enlarged scale. Dotted circle 100 indicates the neutral position of the cam follower which engages the groove 67 at contact point L. If a force F is now applied to the cam 68 this will cause the cam follower to move the distance S to the right as viewed in FIG. 19, as a result of contact with the zone P of the side of the groove 67, to take up the clearances in the synchronising clutch parts into frictional engagement in order to carry out their synchronising action. Dotted circle 101 shows the position of the follower when the synchronising clutch parts are actually carrying out the synchronising action and the follower is contacting the groove 67 at the point M on zone Q of the cam.

As can be seen from FIG. 19 tangents 102 and 103 to the side of the groove 67 at contact points L and M respectively are inclined at angles $\alpha'$ and $\alpha$ respectively to the line of action of the force F applied to the cam from the selector lever. Typically angle $\alpha'$ wil be 45 degrees and angle $\alpha$ will be less than 20 degrees and typically 8 to 13 degrees (say 10 degrees). The use of a small angle $\alpha$ during synchronisation ensures that the axial force FF actually applied to the follower and hence to the associated selector fork is as large as possible so that the effort which must be applied to the gear selector lever in order to engage any synchromesh gear is maintained as low as possible.

The fact that the force FF is larger for smaller angles of $\alpha$ can be readily seen from the simplified two dimensional representations of the geometry of cam follower and groove as shown in FIG. 19 in which the cam groove wall is represented by the straight line $\beta$ at an angle $\alpha$ to the direction of application of the force F applied to the cam.

If the cam follower initially contacts the wall (line $\beta$) at point O and the F force moves the cam through a small peripheral distance OO' so that the wall occupies the dotted line position $\beta'$ it will be seen that the point of contact of the follower with the groove wall will have moved axially to the position O''.

Equating the work input and output of the cam and roller system we have:

$F \times$ cam movement $= FF \times$ axial displacement of cam follower
$F \times OO' = FF \times OO''$ $$F = FF \times \frac{OO''}{OO'}$$

$F = FF \tan \alpha$

Thus as $\alpha$ decreases so the value of FF increases for a given value of F.

After synchronisation has taken place the synchronising coupler is free to move axially and engage the desired gear ratio, circle 104 in FIG. 19 showing the fully engaged position. This movement of the synchronising coupler is brought about by the contact of the zone N of the side of the groove 67 (corresponding to say portion 67d of FIG. 13) with the groove follower. Since it is not necessary to apply the same level of force to the synchronising coupler after synchronisation has occurred the curved zone N of the side of the groove is generally inclined at a larger angle. This larger inclination also means that a larger axial movement of the selector fork and associated coupler can be obtained for a given amount of rotation of the cam when the follower is operating on the zone N of the side of the groove.

Thus the shape of the zones P and N of the side of the groove 67 are chosen to give a large axial movement of the cam follower for a given amount of rotation of the cam while the shape of zone Q adjacent the contact point M is chosen to provide the greatest axial force during actual synchronisation.

It will be appreciated that at the contact point $$L \ FF_L = F/\tan 45° = F/1$$

Similarly at the contact point M $$FF_M = F/\tan 10° = F/0.1736$$

Thus the force generated at the follower is approximately 5.7 times greater at contact point M. Since the force required during synchronisation is approximately five times more than required at the neutral L position this results in a substantially constant load being required at the selector lever for all selector lever positions.

Typically the mean force multiplication ratio of the selector mechanism $$\left( \text{that is the ratio } \frac{\text{Force at the selector fork}}{\text{Force at the drivers hand}} \right)$$

is about 5 to 1 while this ratio ratio is about 2.3 to 1 at the neutral position and about 13 to 1 when synchronisation is occurring. The average multiplication ratio of the cam on its whole travel is $$\frac{\text{total cam displacement}}{\text{total selector fork displacement}} = C/T \text{ from FIG. 19}$$

Typically this ratio is of the order of 2 to 1.

The above described "wavy" cam shape is also employed in the other parts of cam 68 and on cam 50 which controls synchronising units 21 and 22.

Also, although in the construction described above, the cam tracks engaged by the various followers are provided by grooves cut into cam members it will be understood that the tracks could be provided by raised circumferentially extending projections formed on the peripheral surfaces of the cams. Additionally instead of each follower moving between opposed walls provided by a groove or raised projections, the follower could be biased into engagement with a single circumferentially extending wall.

Figure 21:
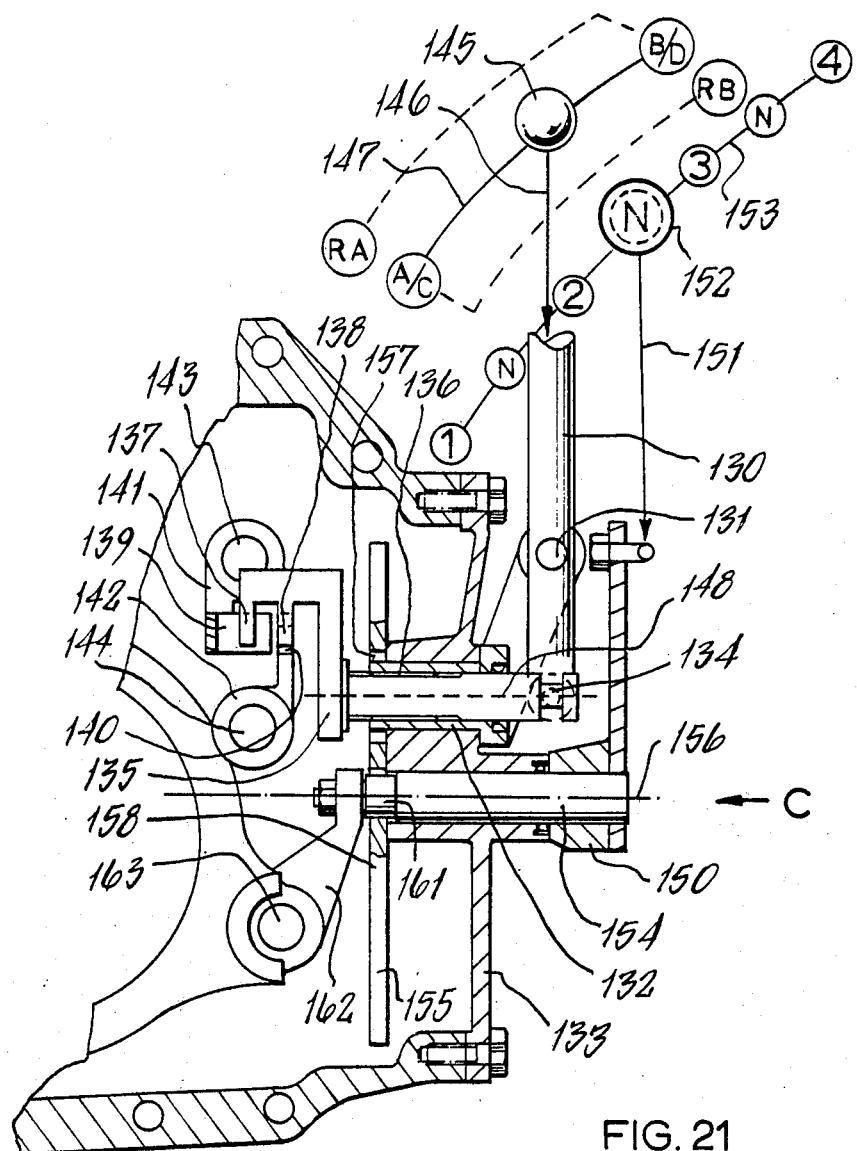
FIG. 21 shows a vertical section through an alternative ratio selection arrangement for input gear set Z and main change speed gear set X.

FIG. 21 shows an alternative form of ratio selection arrangement for input set Z and main change speed gear set X.

The input set Z is controlled by a selector member 130 which is pivotally supported at 131 on a rotatable sleeve 132 carried by a removable cover 133 which closes a transmission casing aperture similar to the aperture 123 referred to above. The lower end of member 130 is connected at 134 with a twin pronged selector member 135 which is splined at 136 for axial sliding movement within sleeve 132.

The prongs 137 and 138 of selector member 135 engage recesses 139 and 140 in members 141 and 142 carried by selector rails 143 and 144 respectively. Rails 143 and 144 are connected with synchronising unit 36 and collar 37 respectively.

Selector member 130 is connected with a selector lever 145 as shown diagrammatically at 146 in FIG. 24, this lever being movable along an S-shaped gate shown diagrammatically at 147.

FIG. 21 shows the lever in a neutral position in which neither synchronising unit 36 nor collar 37 is coupling any of the gears 28, 29, 31, 32 of input set Z to their associated shafts. In order to couple gears 29 and 32 with shafts 30 and 19 the selector member 130 is rotated with the sleeve 132 and member 135 about axis 148 from the position shown in FIG. 21 in a counter clockwise sense when viewed in the direction of arrow C by the movement of lever 145 to the position A/C of gate 147. This moves both selector rails 143 and 144 rearwardly thus coupling gears 29 and 32 to shafts 30 and 19. As indicated by the gate marking A/C either range A or range C is engaged by this movement of lever 145 depending on the position of gear 23 of set Y. In this alternative selection arrangement the movement of gear 23 can be achieved by a convenient means, for example, this can be achieved electro-hydraulically at the press of a button which operates a solenoid-operate valve controlling the supply of hydraulic fluid to a hydraulic actuator.

In order to ensure that collar 37 engages before synchronising unit 36 the clearances in the connecting linkage (not shown) between prong 137 and the synchronising unit 36 are arranged to be greater than the clearances in the connecting linkage (not shown) between prong 138 and the collar 37.

In a similar fashion movement of lever 145 to the B/D position rotates the selector member 135 in a clockwise sense about axis 148 thus coupling gears 28 and 31 to shafts 30 and 19 and engaging range B or D depending on the position of gear 23.

A reverse RA is obtained by pivotting lever 145 to the left from the B/D position to pivot member 130 in an anticlockwise sense about pivot 131 and thus disengaging prong 138 from recess 140. This disconnects the rail 144 from the selector mechanism and allows the selection of reverse range RA to be completed by the movement of the lever 145 to the RA position of gate 147 which rotates member 135 in a counter clockwise sense about axis 148 and moves sleeve 36b rearwardly to couple gear 29 to shaft 30.

A further reverse range RB is obtained by pivotting lever 145 to the right from the A/C position to pivot member 130 in a clockwise sense about pivot 131 and thus disengage prong 138 from recess 140 into recess 139 with prong 137. This disconnects the rail 144 from the selector mechanism and allows the selection of reverse range RB to be completed by the movement of the lever 145 to the RB position of gate 147 which rotates member 135 and a clockwise sense about axis 148 and moves sleeve 36b forwardly to couple gear 28 to shaft 30.

As will be appreciated two reverse ranges are selectable with the gear lever in the RA position dependent on the position of gear 23 and similarly two reverse ranges are selectable with the gear lever in the RB position dependent on the position of gear 23.

The four speed main change speed gear set X is controlled by a rotary selector member 150 which is supported by the cover 133 and is connected (as shown diagrammatically at 151) with a further selector lever 152 which moves in a straight gate 153. Member 150 is connected by shaft 154 with a plate-type cam member 155 (in a manner not shown) so that rotation of member 150 rotates shaft 154 and thus cam 155 about an axis 156.

Figure 22:
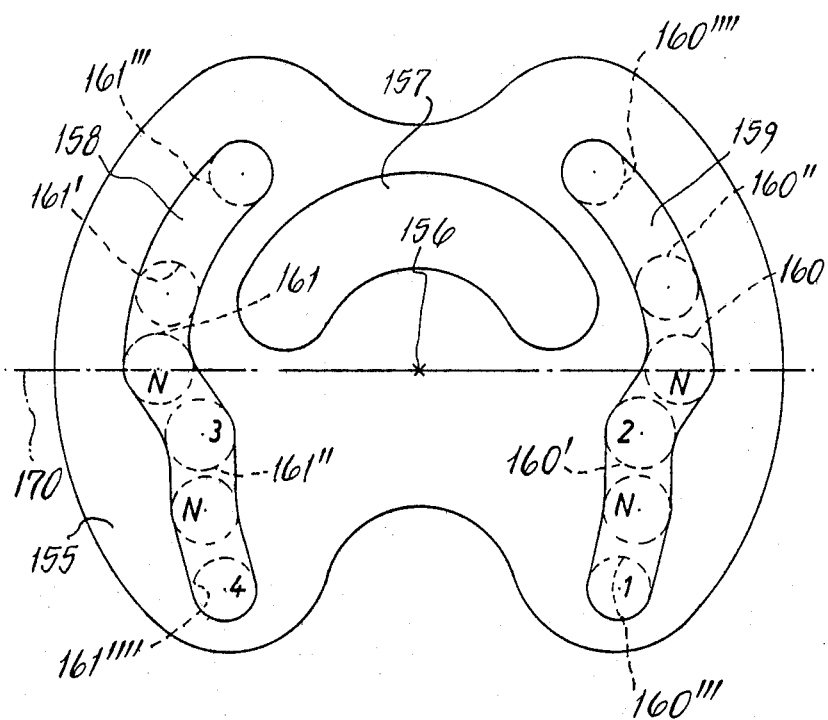
FIG. 22 shows schematically the plate-type cam member used in the arrangement of FIG. 21.

Cam member 155 is shown schematically in FIG. 22 when viewed in the direction of arrow C and includes a slot 157 for the passage of selector member 135 and two cam tracks 158 and 159 for the operation of synchronising units 22 and 21 respectively. Each cam track is engaged by a separate follower 160, 161, only the follower 161 of cam track 158 being visible in FIG. 21, and the centres of both followers 160, 161 are located and maintained on line 170 in FIG. 22.

With the lever 152 in the position shown in FIG. 21 both followers line in the neutral positions indicated by dotted circles 160 and 161 in FIG. 21. Each follower is connected with the associated synchronising unit by an arm and shift rod as shown by arm 162 and rod 163 of follower 161.

As will be appreciated if the lever 152 is rotated rearwardly to the second speed position the cam member 155 is rotated counter clockwise as viewed in FIG. 22 and the followers occupy the position 160' and 161' respectively this moving the sleeve 21a rearwardly to engage the second speed of the main change speed gear set X.

In a similar fashion if lever 152 is rotated forwardly from the neutral position shown in FIG. 21 to the third speed position cam member 155 is rotated in a clockwise sense as viewed in FIG. 22 and the followers occupy the positions 160" and 161" in the cam tracks thus moving the sleeve 22a forwardly to engage the third speed of the gear set X.

As will be appreciated the first and fourth speeds of gear set X can be selected by movement of the lever 152 to the appropriate positions of gate 153 and results in follower positions 160''', 161'' and 160'''' and 161'''' respectively in FIG. 22.

Figure 20:
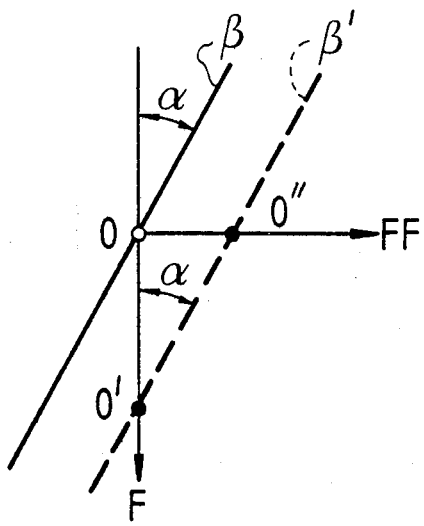
FIG. 20 is a simplified representation of the geometry of the cam follower and groove shown in FIG. 19.

As indicated above FIG. 22 shows the cam member 155 schematically and the two cam tracks 158 and 159 are not depicted as having the 'wavy' cam shape described above in detail with reference to FIGS. 19 and 20. It will be understood, however, that in practice the wavy cam shape will be used on cam tracks 158 and 159 to reduce the lever effort required at synchronisation.

I claim:

1. A vehicle transmission assembly having parallel input (30), output (19) and idler (35) shafts each provided with a first gear wheel (28, 31, 34) and a second gear wheel (29, 32, 33), the first gear wheels (28, 31) on the input and output shafts being in constant mesh and the first gear wheel (34) on the idler shaft being in constant mesh with the input shaft first gear wheel (28) alone, the second gear wheels (29, 32) on the input and output shafts also being in constant mesh and the second gear wheel (33) on the idler shaft being in constant mesh with output shaft second gear wheel (32) alone, first clutch means (36) for alternatively coupling the input shaft first or second gear wheel to the input shaft, second clutch means (37) for alternatively coupling the output shaft first or second gear wheel to the output shaft, and control means (65, 63, 64, 61, 62, 59, 57, 60:65, 63, 64, 70, 71, 68, 67, 69) for engaging the first and second clutch means in order to obtain a number of different output shaft ratios, said assembly being characterised in that one (36) of the first and second clutch means is a synchromesh clutch unit and the other (37) of said first and second clutch means is a non-synchromesh clutch unit, in that the first and second gear wheels (34, 33) of the idler shaft are fixedly rotatable therewith, and in that the control means (65, 63, 64, 61, 62, 59, 57, 60:65, 63, 70, 71, 68, 67, 69) is operable to ensure that the non-synchromesh clutch unit (37) is engaged before the synchromesh clutch unit (36) on the selection of each output shaft ratio.

2. A transmission assembly according to claim 1 characterised in that the first clutch means (36) is the synchromesh clutch unit.

3. A transmission assembly according to claim 1 or claim 2 characterised in that the control means includes a ratio selector means connected with a coupling member (36b, 37) of each clutch unit, each coupling member being axially movable in both directions from a central disengaged position to selectively couple either the first (28, 31) or second (29, 32) gear wheel to the associated shaft (30, 19) and in that the control means further includes a disconnecting means (72, 73, 63, 64) for disconnecting one (37) of the coupling members (36b, 37) from the ratio selector means during part of the selection of those output shaft ratios which require the coupling members to move in opposite axial directions, the arrangement being such that during the selection of those output shaft ratios both coupling members are initially moved in the same axial direction to complete the first part of the selection of said at least one ratio, the disconnecting means is then operated, and one of the coupling members is then moved in the opposite axial direction to complete the ratio selection.

4. A transmission assembly according to claim 3 characterised in that the ratio selector means is connected with a first movable cam formation (67) having a cooperating follower (69) for movement of the coupling member (36b) of the first clutch means (36) and with a second movable cam formation (57) having a cooperating follower (60) for movement of the coupling member of the second clutch means (37), the two cam formations being shaped to ensure that during movement of both cam formations by the ratio selector means to select any given output shaft ratio the follower connected with the non-synchromesh clutch unit (37) engages the non-synchromesh clutch unit first.

5. A transmission assembly according to claim 4 characterised in that the cam formation (67) associated with the synchromesh clutch unit (36) has three zones, a first zone (P) contacted by the associated follower (69) during movement of the coupling member (36b) of the synchromesh unit towards a synchronising position, a second zone (Q) contacted by the follower during synchronisation, and a third zone (N) contacted by the follower after synchronisation has taken place and as the coupling member is moved towards a fully engaged position, the first, second and third zones being shaped so that a tangent (103) to the surface of the second zone of the cam formation at the point of contact (M) with the follower (69) during synchronisation makes a smaller angle ($\alpha$) with the direction of movement (F) of the cam formation than tangents (102) drawing to points of contact (L) with the first and third zones of the cam formation so that for a given selection force applied to the cam formation a larger ratio engagement force (FF) is applied to the follower during synchronisation that when the follower is in contact with the first and third zones.

6. A transmission assembly according to claim 5 characterised in that said angle of inclination of the tangent (103) at the point of contact (M) during synchronisation is less than 20 degrees.

7. A transmission assembly according to claim 4 characterised in that the disconnecting means (72, 73, 63, 64) is arranged to disconnect one of the cam formations (57, 67) from the ratio selector means during said part of the selection of those output shaft ratios which require the coupling members (36b, 37) to move in opposite axial directions.

8. A transmission assembly according to claim 7 characterised in that the connection between the ratio selector means and the cam formations (57, 67) is by way of a rotatable splined shaft (63) and cooperating teeth operatively associated with each cam formation and in that a toggle linkage (72, 73) is provided to axially displace the splined shaft to disengage the teeth associated with one of the cam formations thus disconnecting the associated cam formation from the ratio selector means.

9. A transmission assembly according to claim 3 characterised in that the control means includes two generally parallel shift rails (143, 144) one for each coupling member (36b, 37) and the ratio selector means (145) is connected with a selector member (135) having two formations (137, 138) engageable with cooperating formations (139, 140) associated with the two rails (143, 144), the formations on the selector member being movable in directions generally parallel to the directions of extension of the rails (143, 144) to move said rails and also being movable in directions generally perpendicular to said directions of extension during selection of those output shaft ratio requiring the coupling members to move in opposite directions in order to disconnect one (138) of the formations on the selector means from its cooperating rail formation (140) thus disconnecting the associated coupling member (37) from the ratio selector means (145).

10. A transmission according to claim 9 characterised in that the total clearances to be taken up in the linkage between the coupling member (37) of the non-synchromesh clutch and the associated formation (138) on the selector member (135) before engagement of the non-synchromesh coupling member are arranged to be less than the total clearances to be taken up in the linkage between the coupling member (36b) of the synchromesh clutch and the associated formation (137) on the selector member (135) before engagement of the synchromesh coupling member, thus ensuring that the non-synchromesh coupling member is always engaged first.

11. A transmission assembly according to claim 1 characterised in that the non-synchromesh clutch unit is a collar-type dog clutch (37).

12. A vehicle transmission according to claim 11 characterised by the inclusion of a two speed output gear set (Y) acting between the lay shaft (14) and output shaft (20) of the change speed transmission unit (X).

13. A vehicle transmission according to claim 12 characterised in that the transmission assembly (Z) and output gear set (Y) together provide a lower creeper speed range (A), two intermediate working speed ranges (B, C), and a higher road speed range (D) for the transmission, the arrangement being such that the road speed range (D) can be engaged from either working speed range (B, C) by changing the gear wheel coupled by one of the clutch means of the transmission assembly (Z) or by changing the operating ratio of the two speed output gear set (Y).

14. A vehicle transmission characterised by comprising the combination of an input transmission assembly (Z) in series with a main multi-ratio change speed transmission unit (X); the input transmission assembly (Z) comprising parallel input (30), output (19) and idler (35) shafts each provided with a first gear wheel (28, 31, 34) and a second gear wheel (29, 32, 33), the first gear wheels (28, 31) on the input and output shafts being in constant mesh and the first gear wheel (34) on the idler shaft being in constant mesh with the input shaft first gear wheel (28) alone, the second gear wheels (29, 32) on the input and output shafts also being in constant mesh and the second gear wheel (33) on the idler shaft being in constant mesh with the output shaft second gear wheel (32) alone, first clutch means (36) for alternatively coupling the input shaft first or second gear wheel to the input shaft, second clutch means (37) for alternatively coupling the output shaft first or second gear wheel to the output shaft, and control means (65, 63, 64, 61, 62, 59, 57, 60:65, 63, 64, 70, 71, 68, 67, 69) for engaging the first and second clutch means in order to obtain a number of different output shaft ratios from the input transmission assembly (Z); and the main multi-ratio change speed transmission unit (X) having parallel input (19) and lay (14) shafts and co-axial input (19) and output (20) shafts, the output shaft (19) of the input transmission assembly (Z) forming an extension of, or driving in a co-axial manner, the input shaft (19) of the main change speed transmission unit (X) and the lay shaft (14) of the change speed transmission unit being co-axial with the input shaft (30) of the input transmission assembly (Z).

* * * * *